United States Patent
Brandenstein et al.

[11] Patent Number: 6,106,157
[45] Date of Patent: Aug. 22, 2000

[54] TENSION ROLL

[75] Inventors: Manfred Brandenstein, Eussenheim; Roland Haas, Hofheim; Josef Stork, Gerolzhofen, all of Germany; Vedran Tadic, Tours, France

[73] Assignee: SKF GmbH, Schweinfurt, Germany

[21] Appl. No.: 09/275,823

[22] Filed: Mar. 25, 1999

[30] Foreign Application Priority Data

Mar. 27, 1998 [DE] Germany .............. 298 05 582 U

[51] Int. Cl.$^7$ .............................. F16H 7/08; F16C 13/00
[52] U.S. Cl. .................. 384/546; 384/536; 384/449; 384/477; 29/895.32
[58] Field of Search .................. 384/536, 582, 384/546, 547, 449, 484, 477; 474/190, 191, 192, 161; 492/56; 29/895.32; 264/46.7, 328.1

[56] References Cited

U.S. PATENT DOCUMENTS

| | | |
|---|---|---|
| 2,173,250 | 9/1939 | Fay ............................................ 384/536 |
| 4,025,135 | 5/1977 | Hishida . |
| 4,602,875 | 7/1986 | Doerr et al. ............................. 384/547 |
| 4,668,209 | 5/1987 | Kyoosi et al. .......................... 474/190 |
| 5,120,279 | 6/1992 | Rabe ....................................... 474/161 |
| 5,205,656 | 4/1993 | Cornish et al. . |
| 5,468,070 | 11/1995 | Reidel et al. ....................... 384/449 X |

FOREIGN PATENT DOCUMENTS 30 24 537   1/1982   Germany .

*Primary Examiner*—Richard M. Lorence
*Attorney, Agent, or Firm*—Burns, Doane, Swecker & Mathis, L.L.P.

[57] ABSTRACT

A tension roll includes a rolling bearing protected by a sealing disk and having an outer ring possessing an end face and a bore surface, and an injection molded plastic roller shell arranged on the outer ring of the rolling bearing. The roller shell includes sections that are molded in one piece and cover the end face and the bore surface of the outer ring up to the sealing disk.

18 Claims, 2 Drawing Sheets

TENSION ROLL

This application corresponds to and claims priority under 35 U.S.C. § 119 with respect to German Patent Application No. G 298 05 582.1 filed on Mar. 27, 1998, the entire content of which is incorporated herein by reference.

FIELD OF THE INVENTION

The present invention generally relates to rolling bearings. More particularly, the present invention pertains to a tension roll that includes a rolling bearing, a sealing disk and a roller mantle.

BACKGROUND OF THE INVENTION

DE 30 24 537 discloses a rolling bearing provided with a bearing mantle made of plastic by injection molding. To provide axial fixation, among other things, sections of the bearing mantle are molded on wrap-around parts of the end faces of the outer ring. The bearing chamber is protected with sealing disks that are inserted into the mounting grooves of the outer ring.

During operation, at least one side of the tension roll is exposed to a high degree of contamination. The mounting groove for the seal thus forms a susceptible location through which dirt can enter the bearing or through which lubricant is able to escape from the bearing chamber.

In light of the foregoing, a need exists for a tension roll that is not as susceptible to contamination or loss of lubricant.

It would thus be desirable to provide a tension roll providing an improved coverage and more reliable sealing of the bearing chamber.

SUMMARY OF THE INVENTION

The present invention provides a tension roll having a roller shell provided with sections that are molded in one piece and cover the bore surface of the outer ring up to the sealing disk. The section of the roller shell resting axially on the sealing disk is additionally covered by the mounting groove. This significantly improves the sealing action.

According to one aspect of the invention, a tension roll includes a rolling bearing protected by a sealing disk and having an outer ring possessing an end face and a bore surface, and an injection molded plastic roller shell arranged on the outer ring. The roller shell includes sections molded in one piece and covering the end face and the bore surface of the outer ring up to the sealing disk.

In accordance with another aspect of the invention, a tension roll includes a rolling bearing having an outer ring which possesses an end face and a bore surface, with the rolling bearing including a mounting groove. A sealing disk is located in the mounting groove and a plastic roller shell is disposed on the outer ring. The roller shell includes a bore-side section covering the bore surface of the outer ring and an end-section covering the end face of the outer ring.

A further aspect of the invention involves a method of producing a tension roll. The method includes positioning in a form tool a rolling bearing having an outer ring possessing a bore surface and a mounting groove in which is positioned a sealing disk. After closing the form tool, plastic material is injected into the form tool to produce a plastic roller shell that covers the bore surface of the outer ring and extends up to the sealing disk.

BRIEF DESCRIPTION OF THE DRAWING FIGURES

The foregoing and additional features and characteristics of the present invention will become more readily apparent from the following detailed description considered with reference to the accompanying drawing figures in which like elements are designated by like reference numerals and wherein:

FIG. 1 is a partial longitudinal cross-section of a tension roll with a sealing disk around which is injected an elastomer; and FIG. 2 is a partial longitudinal cross-section of a tension roll with a plate spring as a sealing disk.

DETAILED DESCRIPTION OF THE INVENTION

Figure 1:
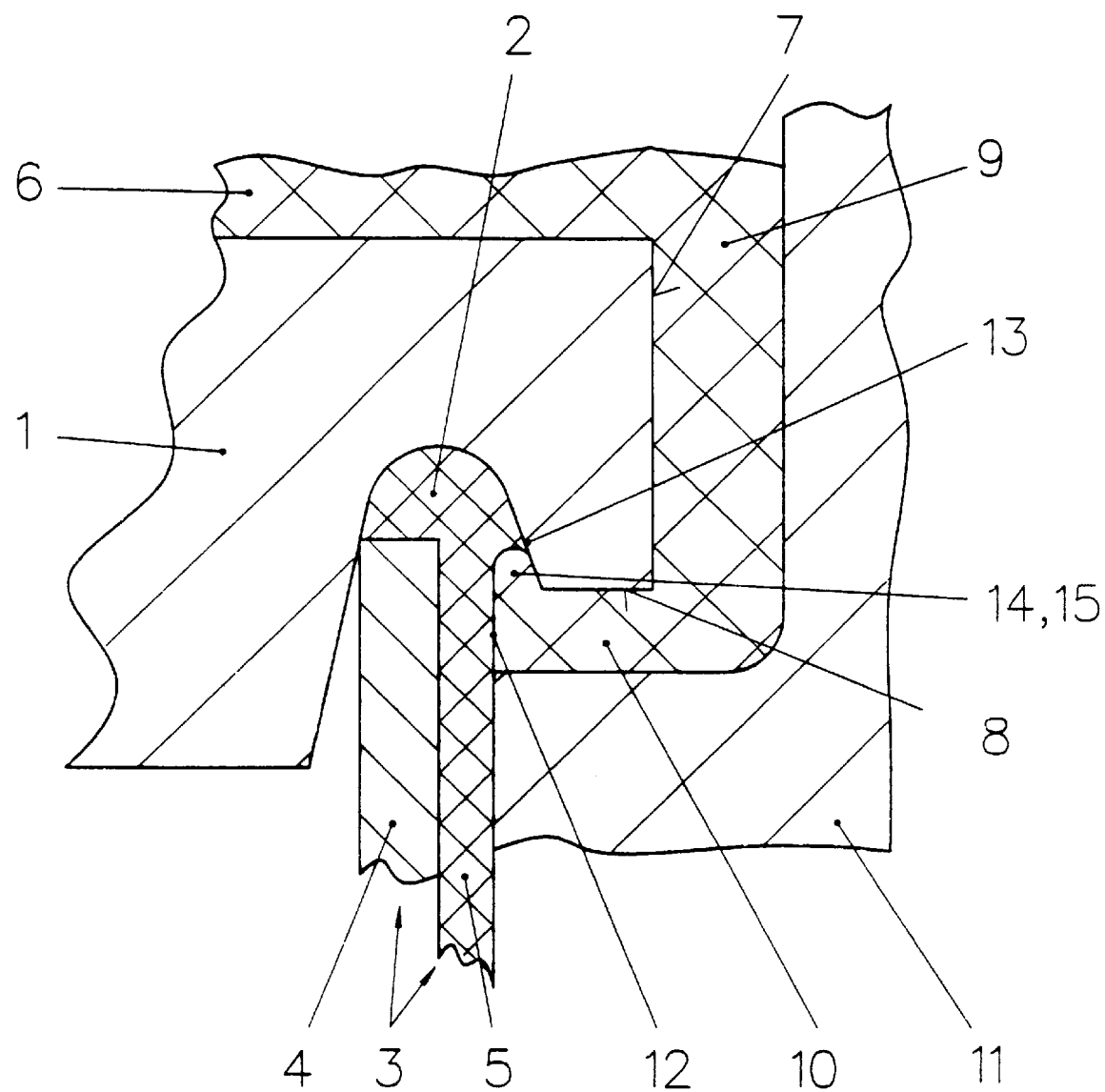
Figure 2:
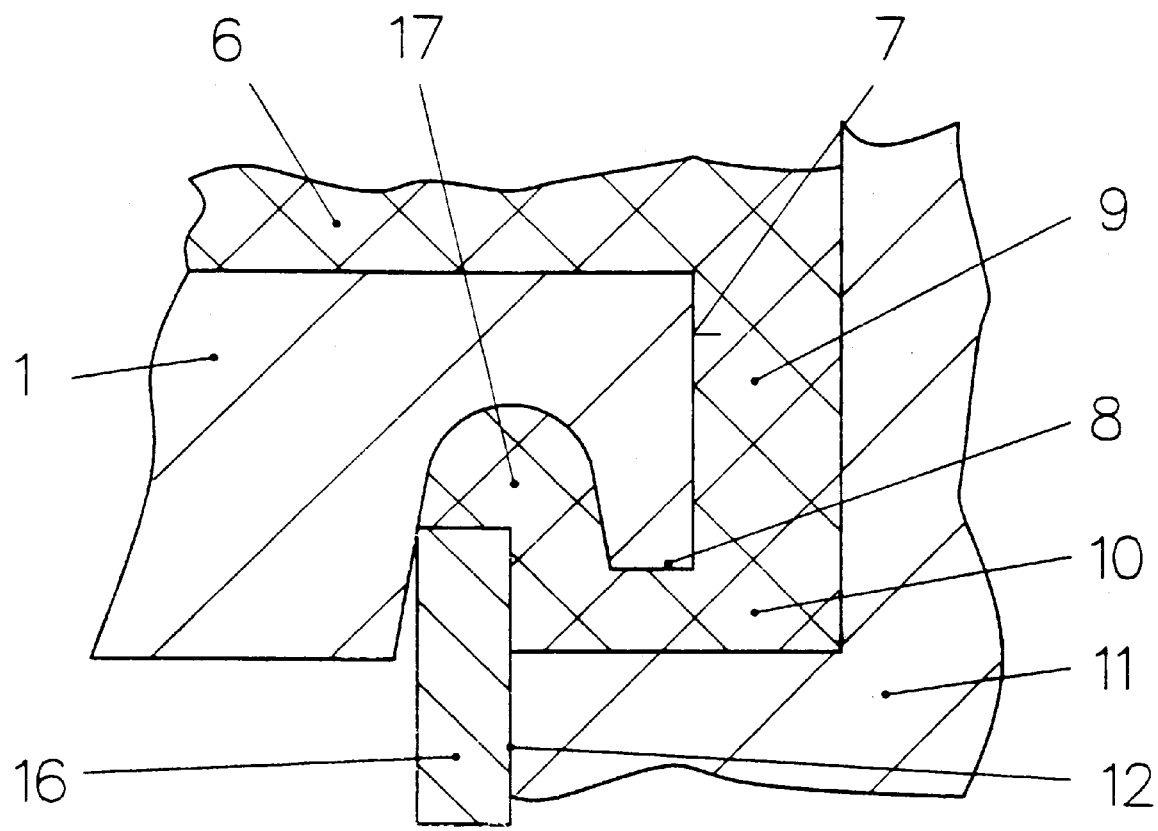

The tension roll shown in FIGS. 1 and 2 consists of a standard commercial rolling bearing comprised of an inner ring and an outer ring, with only a portion the outer ring 1 being illustrated. The outer ring 1 includes a mounting groove 2 in which is positioned a sealing disk 3 forming a part of the tension roll. The outer ring 1 is injection-molded with a roller shell 6 of plastic that is shown only in part in the drawing figures. The roller shell 6, forming a part of the tension roll, includes an end-side section 9 that rests on the end face 7 of the outer ring 1 and a bore-side section 10 that rests on the bore surface 8 of the outer ring 1. The bore-side section 10 of the roller shell extends up to the sealing disk 3 and engages the sealing disk 3.

FIG. 1 illustrates the tension roll 3 after injection molding, but prior to unmolding. Thus, FIG. 1 illustrates the form tool or injection molding die 11 that is used in the injection molding process and shows that the inner, radial ring surface 12 of the form tool 11 rests on the sealing disk 3.

As seen in FIG. 1, the sealing disk 3 includes a metallic support body 4 and an elastomer layer 5 which is slightly compressed by the form tool 11 when the form tool is closed. This causes the elastomer layer 5 to retract from the outer groove flank 13 and form a free space 14 into which plastic material flows in the form of an annular edge 15 during the injection molding process. The injection molding pressure also causes a slight compression of the elastomer layer 5 in this area. Thus, after the removal of the form tool 11, the area of the elastomer layer 5 facing the annular surface 12 rests with an axial pre-load on the annular surface 12 of the bore-side section 10. This results in a permanent closure of the mounting groove 2, and thus in an improved seal at this place.

According to the alternative shown in FIG. 2, a sealing disk in the form of a spring-loaded plate disk 16 is set in the mounting groove of the outer ring 1. When the form tool is closed, the spring-loaded plate disk 16 is pressed as shown by the annular surface 12 of the form tool so that the plate disk 16 is radially planar. After the unmolding of the form tool 11, the plate disk 16 springs back and comes to rest with an axial pre-load against the bore-side section 10 of the plastic material. The residual volume 17 of the mounting groove 2 is also filled with plastic material during the injection molding process and acts as a seal at this place. The result is a tension roll having improved sealing capability.

A method according to the present invention as generally described above for fabricating the tension roll involves positioning the rolling bearing in the form tool, with the sealing disk 3, 16 being located in the mounting groove within the outer ring of the rolling bearing. After the form tool 11 is closed, plastic material is injected into the form tool to produce the plastic roller shell 6. The plastic material is injected to produce a bore-side section 10 of the roller shell 6 that covers the bore surface 8 of the outer ring 1 up to and in engagement with the sealing disk 3. The injection of the plastic material also produces the end-side section 9 of the plastic roller shell 6 that covers the end face 7 of the outer ring 1. The entire plastic roller shell 6, including the bore-side section 10 and the end-side section 9, is formed integrally, in one piece and at the same time.

As mentioned above in connection with the embodiment shown in FIG. 1, upon closure of the form tool or injection molding die 11, a portion of the form tool 11 engages the elastomer layer 5 to cause a slight compression of the elastomer layer 5. A portion of the elastomer layer 5 filling the mounting groove 2 thus retracts from the outer groove flank 13 to form a space 14. During the injection of the plastic molding material, this space 14 is filled with the plastic material to produce an annular edge 15. After the form tool or injection molding die 11 is opened or removed, the elastomer layer 5 rests with an axial pre-load on the facing surface of the form tool 11.

In the embodiment shown in FIG. 2, the closure of the form tool 11 causes the spring-loaded plate disk 16 to be pressed by a portion of the form tool, thus causing the plate disk 16 to be radially planar. Once the form tool 11 is opened or removed, the force applied by the form tool 11 to the plate disk 16 is removed and the plate disk 16 is able to spring back and apply an axial pre-load against the bore-side section 10 of the plastic roller shell 6.

The present invention thus provides a tension roll of improved construction which is not a susceptible to lubricant loss or contamination, and which exhibits improved sealing capability.

The principles, preferred embodiments and mode of production of the present invention have been described in the foregoing specification. However, the invention which is intended to be protected is not to be construed as limited to the particular embodiments described. The embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A tension roll comprising: a rolling bearing protected by a sealing disk and having an outer ring possessing an end face and a bore surface; and an injection molded plastic roller shell arranged on the outer ring, the roller shell including sections molded in one piece and covering the end face and the bore surface of the outer ring up to the sealing disk.

2. The tension roll as claimed in claim 1, wherein said sections of the roller shell include a bore-side section covering the bore surface of the outer ring, the sealing disk resting with an axial pre-load on an inner annular surface of the bore-side section.

3. The tension roll as claimed in claim 1, wherein the sealing disk is a plate disk possessing axial spring-action.

4. The tension roll as claimed in claim 1, wherein said sealing disk is positioned in a mounting groove of the outer ring, said sealing disk including a support body and an elastomer that is injection molded around the support body at least in the mounting groove.

5. The tension roll as claimed in claim 4, wherein said sections of the roller shell include a bore-side section covering the bore surface, and including an annular space provided in the elastomer that is located in mounting groove, the bore-side section including an annular edge engaging the annular space in the elastomer of the sealing disk.

6. A tension roll comprising: a rolling bearing including an outer ring which possesses an end face and a bore surface, the rolling bearing being provided with a mounting groove; a sealing disk located in the mounting groove; and a plastic roller shell disposed on the outer ring, the roller shell including a bore-side section covering the bore surface of the outer ring and an end-section covering the end face of the outer ring.

7. The tension roll as claimed in claim 6, wherein said bore-side section of the roller shell engages the sealing disk.

8. The tension roll as claimed in claim 6, wherein said sealing disks rests with an axial pre-load on an inner annular surface of the bore-side section of the roller shell.

9. The tension roll as claimed in claim 6, wherein the sealing disk is a plate disk possessing axial spring-action.

10. The tension roll as claimed in claim 6, wherein said sealing disk includes a support body and an elastomer that is injection molded around the support body at least in the mounting groove.

11. The tension roll as claimed in claim 10, including an annular space provided in the elastomer that is located in mounting groove, the bore-side section including an annular edge engaging the annular space in the elastomer of the sealing disk.

12. A method of producing a tension roll comprising:
positioning a rolling bearing in a form tool, said rolling bearing including an outer ring possessing a bore surface, said rolling bearing including a mounting groove in which is positioned a sealing disk;
closing the form tool; and
injecting plastic material into the form tool to produce a plastic roller shell that covers the bore surface of the outer ring and extends up to the sealing disk.

13. The method according to claim 12, wherein the outer ring possesses an end face, said step of injecting plastic material including injecting plastic material to produce a plastic roller shell that covers the end face of the outer ring.

14. The method according to claim 12, wherein the sealing disk includes a metal support body and an elastomer layer provided on the metal support body, the elastomer layer being positioned in the mounting groove, the elastomer layer being compressed by a portion of the form tool.

15. The method according to claim 14, wherein a space is formed in the elastomer layer as a result of the elastomer layer being compressed by the portion of the form tool, said step of injecting plastic material involving filling said space in the elastomer layer with plastic material.

16. The method according to claim 14, wherein the step of injecting plastic material causes compression of the elastomer layer so that after removal of the form tool the elastomer rests with a preload on a section of the plastic roller shell that covers the bore surface of the outer ring.

17. The method according to claim 12, wherein the sealing disk is a spring-loaded disk plate that is pressed by a portion of the form tool when the form tool is closed, said disk plate springing back upon removal of the form tool so that the disk plate rests with an axial preload on a section of the plastic roller shell that covers the bore surface of the outer ring.

18. The method according to claim 12, wherein the step of injecting plastic material causes plastic material to flow into the mounting groove.

* * * * *